United States Patent [19]
Fontaine et al.

[11] 3,877,286
[45] Apr. 15, 1975

[54] CLOSER FOR SHEET METAL LOCKS

[76] Inventors: Raymond L. Fontaine, 6301 Holstein Way, Sacramento, Calif. 95822; Gary R. Fontaine, 7280 Los Rior Dr., Carmichael, Calif. 95608

[22] Filed: Aug. 12, 1974

[21] Appl. No.: 496,480

[52] U.S. Cl. .................. 72/450; 29/243.58; 72/453; 72/470; 113/54
[51] Int. Cl. ............................................ B21d 19/02
[58] Field of Search ............. 72/450, 453, 470, 475, 72/379, 387, 412, 409; 113/54; 29/200 B, 243.58, 243.5

[56] References Cited
UNITED STATES PATENTS

| | | | |
|---|---|---|---|
| 2,959,205 | 11/1960 | Day | 113/54 |
| 3,421,356 | 1/1969 | Buske | 113/54 |
| 3,602,032 | 8/1971 | Skintzis | 29/243.58 |
| 3,777,687 | 12/1973 | Colman | 29/243.58 |

*Primary Examiner*—C. W. Lanham
*Assistant Examiner*—Gene P. Crosby
*Attorney, Agent, or Firm*—Lothrop & West

[57] ABSTRACT

A closer is provided for use with a sheet metal lock. The lock is of substantially U-shaped cross-section and has parallel inner and outer legs and an intermediate leg joining said inner and outer legs about at right angles thereto. The closer has a stationary plate adapted to abut the intermediate leg. The stationary plate is provided with a first edge. The closer also has a movable plate adapted to abut the outer leg. The movable plate is provided with a second edge. A hinge connects the stationary and movable plates for relative swinging movement about an axis approximately coincident with the edges. An actuating mechanism has a cylinder fixed to the stationary plate and provided with a hand grip. A piston reciprocable in the cylinder is connected to the movable plate for swinging the movable plate through about ninety degrees toward the stationary plate under gas pressure controlled by a valve on the hand grip. A spring returns the piston and movable plate to original position. There is a tooth upstanding from the stationary plate adapted to abut the inner leg of the lock.

8 Claims, 4 Drawing Figures

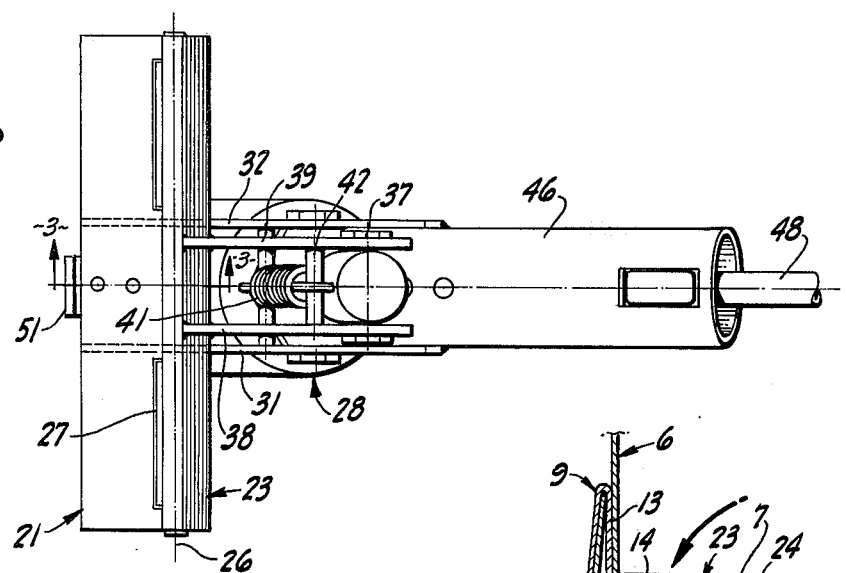
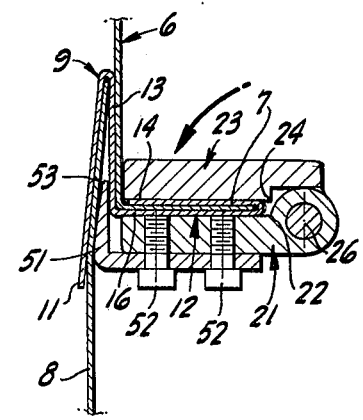
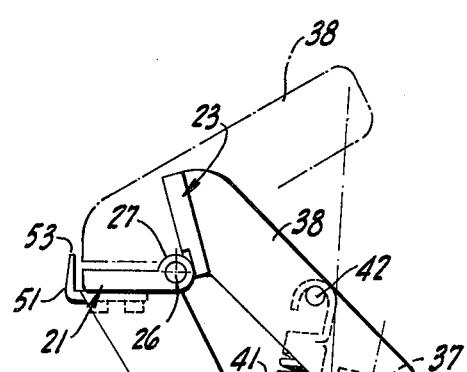
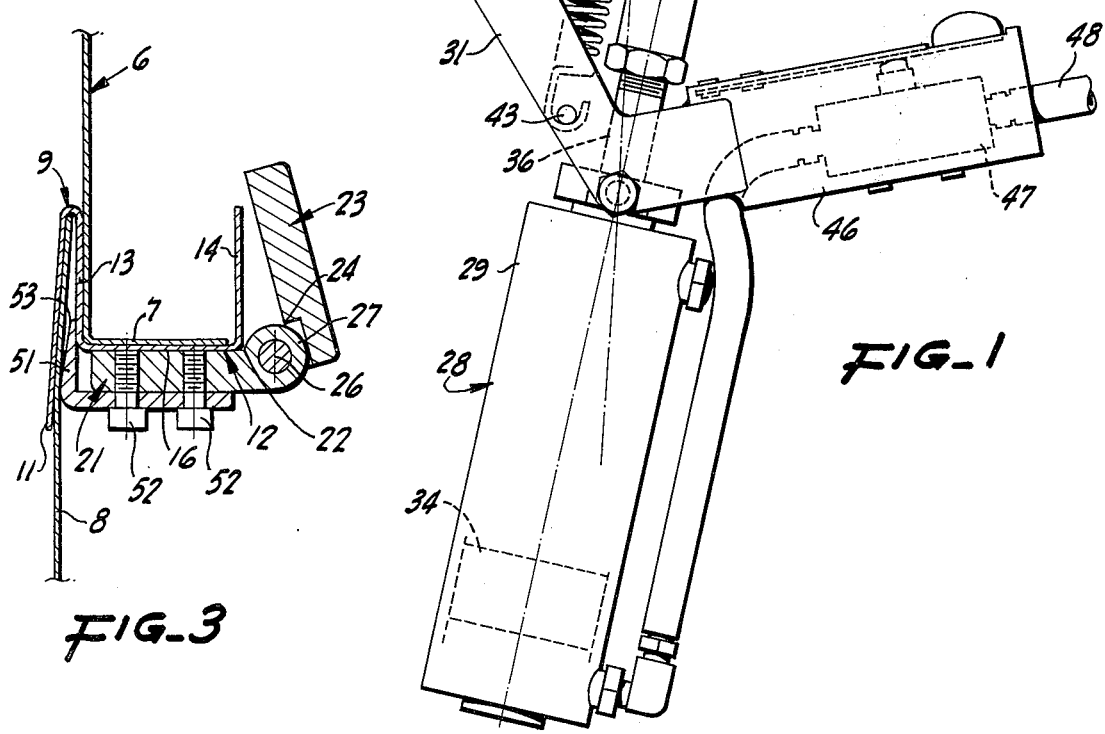

CLOSER FOR SHEET METAL LOCKS

In assembling standard sheet metal ducts, it is customary to arrange one duct telescoping with the other duct, the outer duct having an outstanding peripheral flange. To secure the telescoped ducts together there is customarily provided a sheet metal lock, often termed a government lock. This is a clip arranged to slip over the end of the inner duct and to have a portion adapted to receive the flanged end of the outer duct. The lock includes a portion having a substantially U-shaped cross-section with parallel inner and outer legs and an intermediate leg joining the inner and outer legs and lying approximately at right angles thereto. The telescoped ducts are held in assembled position by bending over the outer leg of the clip to overlie the outstanding flange of the outer duct and to clamp that flange between the folded or bent over outer leg and the still outstanding intermediate leg. This operation is customarily done by hand, usually in several steps progressively bending over the clip outer leg and finally moving it into very close approach to the intermediate leg. Tools are provided for accomplishing part of this work but customarily they cannot be utilized until after some handwork has been accomplished at least to start the bending of the outer leg with respect to the intermediate leg. This involves substantial labor and does not always lead to an appropriate and effective lock nor a quick, satisfactory job.

Some ducts are assembled in a shop where there is adequate room for work so that tools of almost any configuration have space in which to be used. Under other circumstances ducting is assembled and finally locked together in structures wherein the surrounding room is extremely small and cramped and not every sort of tool can readily be manipulated.

It is therefore an object of the invention to provide a closer for a sheet metal lock in which no preliminary or subsequent handwork is necessary and all of the closing and locking functions are performed by the device itself.

Another object of the invention is to provide a closer for a sheet metal lock that is relatively compact, light and easy to handle so that it can be utilized not only in the shop but also on the job wherein the operating quarters may be quite restricted.

A further object of the invention is to provide a closer for a sheet metal lock actuated easily and appropriately by power so as to conserve manual effort.

A further object of the invention is to provide a closer for a sheet metal lock that produces a finished job at least equal to and usually superior to the best handwork.

A further object of the invention is to provide a closer for a sheet metal lock that can readily be understood and utilized by relatively unskilled labor, that is safe to use, and readily and firmly engages the work without taxing the skill or strength of the user.

Another object of the invention is in general to provide an improved closer for a sheet metal lock.

Other objects together with the foregoing are attained in the embodiment of the invention described in the accompanying description and illustrated in the accompanying drawings, in which:

FIG. 1 is a side elevation of a closer for sheet metal locks;

FIG. 2 is a plan of the structure of FIG. 1, shown to a reduced scale;

FIG. 3 is a cross-section, the plane of which is indicated by the line 3—3 of FIG. 2 and showing, to an enlarged scale, the closer in an initial position; and FIG. 4 is a view similar to FIG. 3 and showing the closer in a final position.

While the closer for a sheet metal lock can be embodied in a number of different ways particularly designed for special kinds of locks, it has been with success incorporated as shown herein for use with a so-called government lock. In this environment there is included an outer sheet metal duct 6, usually of rectangular cross-sectional configuration and at one end having an outer flange 7 that projects from the main body of the duct 6 substantially at right angles. Inserted into or telescoped with the duct 6 upon assembly is an inner duct 8 having a plain end making an approximate fit within the duct 6 and underlapping or projecting into the outer duct 6 a substantial amount.

Interposed between the inner and outer ducts and occupying a slight clearance therebetween is a sheet metal lock 9. This is a plate or strip of bendable sheet metal having a hook portion 11 designed to embrace the end of the duct 8 and to be disposed alongside the inner surface of such duct. The lock then curves over the end of the duct 8 to provide a portion 12 with a U-shaped cross-sectional configuration. This U-shaped portion is inclusive of an inner leg 13, an outer leg 14 substantially parallel to the inner leg 13, and an intermediate leg 16 connecting the inner and outer legs 13 and 14 and extending substantially at right angles to both of them and parallel to the flange 7 on the duct 6.

It is customary to secure the partial assembly in permanently connected condition by hand hammering the outer leg 14 over the flange 7, in the direction indicated by the heavy arrow in FIG. 4, the outer leg 14 being forced as closely as possible toward the intermediate leg 16 and in effect clamping or gripping the flange 7 between the intermediate leg 16 and the outer bent leg 14.

To accomplish this bending operation appropriately and without undue handwork, we provide the closer described herein. The device includes a stationary plate 21 usually of rectangular configuration and having a size and extent as to abut approximately the intermediate leg 16 while extending therealong an arbitrary distance, say, 6 or 8 inches for a normal size duct. The stationary plate 21 has an edge 22 along one side thereof. Similarly, there is provided a movable plate 23 comparable to the plate 21 and designed to abut the upstanding outer leg 14, being substantially the same transverse dimension thereof and extending therealong for an arbitrary distance, say, 6 or 8 inches. The movable plate 23 likewise has an edge 24 extending along one side thereof, substantially parallel to the edge 22.

For connecting the stationary and movable plates together for relative movement about an axis 26 parallel to the edges 22 and 24, there is provided a hinge 27 so sized and located as to maintain the edges 22 and 24 almost coincident with the axis 26 or as nearly coincident therewith as is mechanically feasible.

Power means are provided for effecting swinging movement of the movable plate with respect to the stationary plate. For that reason there is provided an actuating mechanism, generally designated 28, inclusive of an outer cylinder 29 having webs 31 and 32 uniting the cylinder 29 with the stationary plate 21.

Included in the actuating mechanism and reciprocable within the cylinder 29 is a piston 34 connected to a piston rod 36 which extends from the cylinder 29 and is joined by a cross pin 37 to provide a pivotal connection with a pair of arms 38 and 39 fast on the movable plate 23. Since preferably the piston 34 is power actuated in but one, clamping direction only, a spring 41 is provided to urge the piston back toward its initial, open location when pressure thereon is released. The spring at one end is connected to a cross pin 42 spanning the arms 38 and 39 and at the other end is connected to a fastening 43 on the cylinder 29.

For hand support of the closer, there is provided a hand grip 46 merging with the cylinder 29. For convenient access by the hand of the person gripping the grip 46 a control valve 47 is mounted on the cylinder and is interposed in a pressure gas supply line 48 leading to the interior of the cylinder 29.

It is highly important for reasons of quick operation, improved distribution of forces and especially for safety to provide a means for permitting the user effectively to grip the sheet metal lock and to hold the closer against slipping or arbitrary dislodgement, especially by force. For that reason we particularly provide on the stationary plate 21 at a point opposite the edge 22 there of and preferably extending therealong, although usually for only a short distance, an upstanding tooth 51. This can be integral with the plate 21 but conveniently is made of a detachable member removably secured in place by fastenings 52. The tooth is relatively thick for most of its area but preferably has a sharp leading edge 53.

In the operation of this closer and assuming that the hose 48 is supplied with gas under pressure; for example, shop air or compressed $CO_2$ gas, the user grips the hand grip 46 and manipulates the closer into a position alongside the unbent U-shaped portion of the government clip with the stationary plate 21 in abutment with the intermediate leg 16, with the movable plate 23 in abutment with the outer leg 14 and with the axis 26 as closely as possible disposed near to and alongside the clip bend between the intermediate and outer legs. Most important, these parts are held in that initial position by a preliminary engagement of the tooth 51 with the inner leg 13 and preferably interposed between the inner leg 13 and the outer surface of the inside duct 8.

Usually the space therebetween the sheet metal parts is adequate for easy insertion of the tooth 51 but sometimes the space is relatively small. If so, the tooth is engaged by first inserting the sharpened edge 53 and forcing it into full location, with the stationary plate abutting the intermediate leg as closely as possible.

With the tool so positioned the user then actuates the gas valve 47. Pressure gas admitted to the cylinder 29 forces the piston 34 therealong and projects the piston rod 36 against the urgency of the spring 41. Thus, the movable plate is swung about the axis 26 through an angle of about 90° and approaches the stationary plate. This bends the outer leg 14 over the outstanding flange 7 and brings the outer leg into virtual parallelism with the flange 7, thus performing the function of locking the ducts together.

Upon accomplishment of this motion the user releases the valve 47. This permits discharge of the pressure gas from the cylinder. The spring 41 then returns the movable plate through about 90° to its original position with respect to the stationary plate. If the duct is relatively small that may be the only action necessary to handle the leg 14. However, if the duct is quite wide it may be necessary to slide the open tool along the duct into another position similar to that described and again to actuate the valve 47 to produce another downturned portion of the outer leg 14. During any lateral sliding movement the tooth 51 can usually be left in position to guide the tool. If however, it is necessary to do so, the tool can be manipulated easily to withdraw the tooth from in between the inner duct 8 and the inner leg 13 and then to reinsert it at a point farther along the lock 9. The previous actions are repeated and are continued until enough bending has taken place to meet the specifications or to insure that the ducts 6 and 8 are held in assembled position. The tool is then removed for subsequent use.

What is claimed is:

1. A closer for sheet metal locks having a substantially U-shaped cross-section with an inner leg, an outer leg parallel thereto, and an intermediate leg joining said inner and outer legs approximately at right angles thereto comprising a stationary plate having a first edge and adapted to abut said intermediate leg, a movable plate having a second edge and adapted to abut said outer leg, a hinge connecting said stationary plate and said movable plate together for relative swinging movement about an axis parallel to said first and second edges, an actuating mechanism including a cylinder and a piston reciprocable therein, means for connecting said cylinder to one of said plates, means for connecting said piston to the other of said plates, and means on said stationary plate opposite said first edge for engaging said inner leg.

2. A closer as in claim 1 in which said engaging means in a tooth upstanding from said stationary plate.

3. A closer as in claim 1 in which said cylinder is connected to said stationary plate and said piston is connected to said movable plate.

4. A closer as in claim 1 in which said actuating mechanism is connected to move said movable plate toward said stationary plate and in which said closer includes a spring connected to urge said movable plate away from said stationary plate.

5. A closer as in claim 1 in which said actuating mechanism is connected to move said movable plate through approximately 90° with respect to said stationary plate.

6. A closer as in claim 1 in which said axis and said edges are approximately coincident.

7. A closer as in claim 1 including a hand grip connected to said actuating mechanism.

8. A closer as in claim 7 including means for supplying said actuating mechanism with an actuating fluid, and a valve in said supplying means for controlling flow of actuating fluid therethrough and disposed for manipulation by a hand grasping said hand grip.

* * * * *